United States Patent [19]
Kamm

[11] 4,054,746
[45] Oct. 18, 1977

[54] ELECTRONIC COORDINATE POSITION DIGITIZING SYSTEM

[75] Inventor: Vernon C. Kamm, Farmington Hills, Mich.

[73] Assignee: Data Automation Corporation, Farmington, Mich.

[21] Appl. No.: 716,039

[22] Filed: Aug. 20, 1976

Related U.S. Application Data

[63] Continuation-in-part of Ser. No. 624,527, Oct. 22, 1975, abandoned.

[51] Int. Cl.² ............................................. G08C 21/00
[52] U.S. Cl. .................................................... 178/19
[58] Field of Search ............................ 178/18, 19, 20; 340/347 AD, 146.3 SY

[56] References Cited

U.S. PATENT DOCUMENTS

| | | | |
|---|---|---|---|
| 3,466,646 | 9/1969 | Lewin | 178/19 |
| 3,593,115 | 7/1971 | Dymerae | 178/19 |
| 3,647,963 | 3/1972 | Bailey | 178/19 |
| 3,699,253 | 10/1972 | Freedman | 178/19 |
| 3,735,044 | 5/1973 | Centner et al. | 178/19 |
| 3,801,733 | 4/1974 | Bailey | 178/19 |
| 3,819,857 | 6/1974 | Inokuchi | 178/19 |
| 3,904,822 | 9/1975 | Kamm et al. | 178/19 |

Primary Examiner—Thomas A. Robinson
Attorney, Agent, or Firm—Reising, Ethington, Barnard

[57] ABSTRACT

An electronic position measuring system is disclosed for use in a digitizer of the type which converts analog information in graphical form to digital information. The system provides small scale or fine measurement by means of a polyphase grid winding with pulsed polyphase excitation. A cursor is movable over the grid winding and develops a position signal which has a phase angle corresponding to the position within a grid cycle. Phase angle measuring means are provided to derive the position information. The system also includes a large scale or coarse measurement grid comprising plural parallel conductors with at least one conductor per grid cycle. Excitation means are provided for sequentially pulsing the conductors and means connected with the cursor develop a stop signal in response to pulsing of the conductor nearest the cursor. A position counter counts the excitation pulses until the stop signal occurs and thus registers a count corresponding to the position of the cursor. The polyphase grid winding is provided with phase windings having plural distributed conductors per pole to produce an approximately sinusoidal distribution of magnetic flux over each pole of the winding to increase the accuracy of position measurement.

25 Claims, 21 Drawing Figures

ELECTRONIC COORDINATE POSITION DIGITIZING SYSTEM

REFERENCE TO RELATED APPLICATIONS

This application is a continuation-in-part of U.S. Application Ser. No. 624,527, filed Oct. 22, 1975 entitled "Digitizer", now abandoned.

FIELD OF THE INVENTION

This invention relates to position measurement systems; more particularly, it relates to electronic position measurement systems of the type commonly known as data tablets or digitizers.

Digitizers are commonly used in deriving data in digital form from an analog representation, such as an engineering drawing or a map. The digitizer generally employs a two-dimensional reference table surface, similar to a drafting board, on which the map or drawing is mounted and a stylus or cursor is used to point to specific positions and the digitizer produces a digital representation of the position of the cursor.

BACKGROUND OF THE INVENTION

One class of digitizers utilizes an inductive winding in the table and an inductive winding in the cursor with inductive coupling therebetween. An excitation source is connected with one of the windings and a signal processing circuit is connected with the other to obtain position information. The winding in the table comprises a two-phase grid winding for each coordinate axis with each phase of a grid winding being comprised of parallel, equally spaced conductors. One of the windings is driven with a sinusoidal excitation current and a signal from the processing circuit is of constant amplitude and has a variable phase angle which varies with the position of the cursor relative to the grid winding. Means are provided to measure the phase angle as an indication of cursor position. This system is used for obtaining small scale or fine position measurement and additional means are provided for large scale or coarse position measurement. A digitizer of this type is disclosed in the Bailey U.S. Pat. No. 3,647,963. Similar digitizers are disclosed in Bailey U.S. Pat. No. 3,801,733, Freedman U.S. Pat. No. 3,699,253 and the Centner et al. U.S. Pat. No. 3,735,044. The prior art devices of this type require the use of analog circuits for system excitation. Additionally, the coarse measurement means is of the incremental type, such as that based upon counting cycles; this requires each measurement to be made with the cursor starting from a given reference position.

Another class of digitizers uses pulse excitation of either the cursor winding or the table winding. In one form, plural coils in the table produce individual output signals which, taken collectively, constitute a binary signal representing the position of the cursor. A digitizer of this type is disclosed in the Lewin U.S. Pat. No. 3,466,646 and a similar system is disclosed in the Inokuchi U.S. Pat. No. 3,819,857. This device requires a large number of conductors and the accuracy depends upon conductor placement. In another form, as shown in Kamm et al U.S. Pat. No. 3,904,822, multiple conductors in the table are sequentially pulsed and the cursor signal is processed to obtain position information. This is useful for only small distance and is of limited accuracy.

An additional class of digitizers utilizes capacitive coupling between a cursor and a conductive sheet or grid. Such a device is disclosed in the Asano et al U.S. Pat. No. 3,591,718. Similar devices are disclosed in the Dym et al U.S. Pat. No. 3,593,115, Dym U.S. Pat. No. 3,668,313 and the Ellis et al U.S. Pat. No. 3,567,859. This type of device affords only moderate accuracy over relatively small distances.

SUMMARY OF THE INVENTION

According to this invention, position measurement is accomplished using a polyphase grid winding which is excited by a pulsed polyphase current. This has the advantage of simplifying the excitation and detection circuitry which can be implemented almost entirely with digital switching circuits and a minimum of analog circuitry. This system is especially adapted for small scale or fine measurement with a high degree of accuracy.

Further, in accordance with this invention, large scale or coarse measurement is accomplished with a pulsed grid separate from the fine measurement grid together with means for determining the address of the coarse grid conductor nearest the cursor. This affords the advantage of absolute coarse measurement of the cursor position, i.e. its position relative to the origin of the coordinate axis, as distinguished from incremental measurement which is dependent upon the previous position of the cursor.

Additionally, in accordance with this invention, a distributed current winding is utilized for each phase of the fine measurement grid winding. This provides a space distribution of magnetic flux which approximates a sinusoidal waveform and consequently a substantially linear relation between phase shift of the position signal and the cursor position. Highly accurate measurements may be achieved with linear phase shift.

DETAILED DESCRIPTION OF THE INVENTION

A more complete understanding of this invention may be obtained from the description that follows taken with the accompanying drawings in which.

Figure 1:
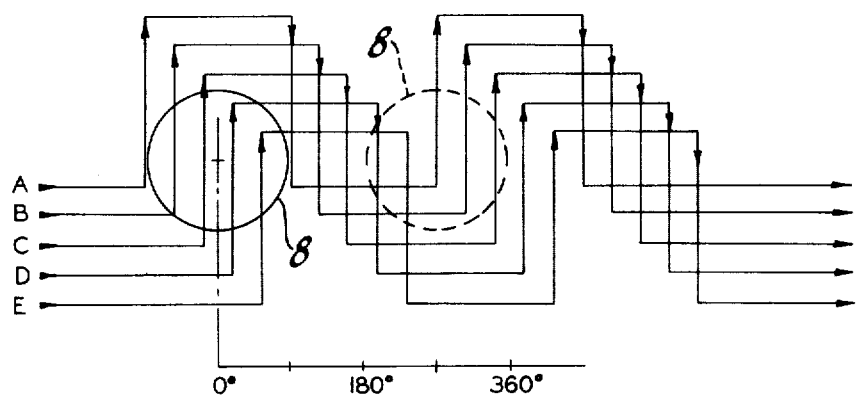
FIG. 1 shows a polyphase grid winding according to this invention.

Referring now to the drawings, an exemplary embodiment of the invention will be described in detail as it is utilized in a particular digitizer. In particular, the digitizer to be described is provided with a fine measurement system embodying a pulsed polyphase grid system, a coarse measurement system embodying an absolute position measuring system and distributed current phase windings in the fine measurement grids, all in accordance with this invention.

FINE MEASUREMENT SYSTEM

A small scale or fine measurement system will be described which embodies a plused polyphase grid system. In general, the grid winding for each coordinate axis comprises a polyphase winding which is excited by a polyphase current. The detected signal has an envelope waveform with a phase relation to the excitation currents which varies with the position of the cursor.

Any number of phases greater than one can be used but the analog circuitry for the signal becomes less critical as the number of phases increases. For purposes of illustration a five-phase system will be described.

Figure 2:
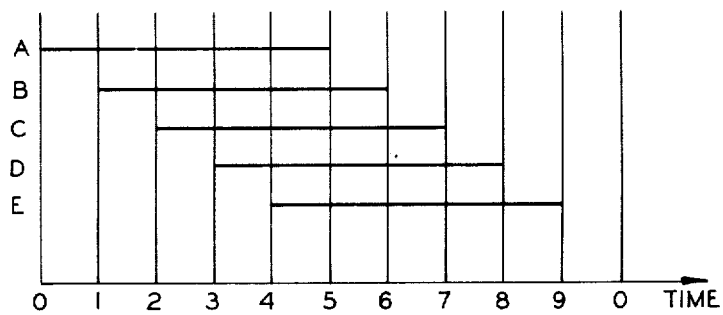
FIG. 2 is a timing diagram showing the excitation of the phase windings.

FIG. 1 shows a selected portion of a five-phase winding comprising phase windings A, B, C, D and E which are equally spaced. Each phase winding is driven by a current-source switch with the currents turned on and off in sequence as shown in FIG. 2. The drive currents are turned on and off at any convenient repetition rate, (e.g., 5 kHz) and one cycle of this repetition frequency (having a period of 200 microseconds) is divided into $n$ parts (10 for this illustration) where $n$ is twice the number of grid-phase windings. As FIG. 2 shows, the current sources are turned on in sequence (e.g., at 20 microsecond intervals) for one-half of the duration of a repetition cycle, and then they are turned off in the same sequence (at 20 microsecond intervals) for the remainder of the cycle.

Figure 3:
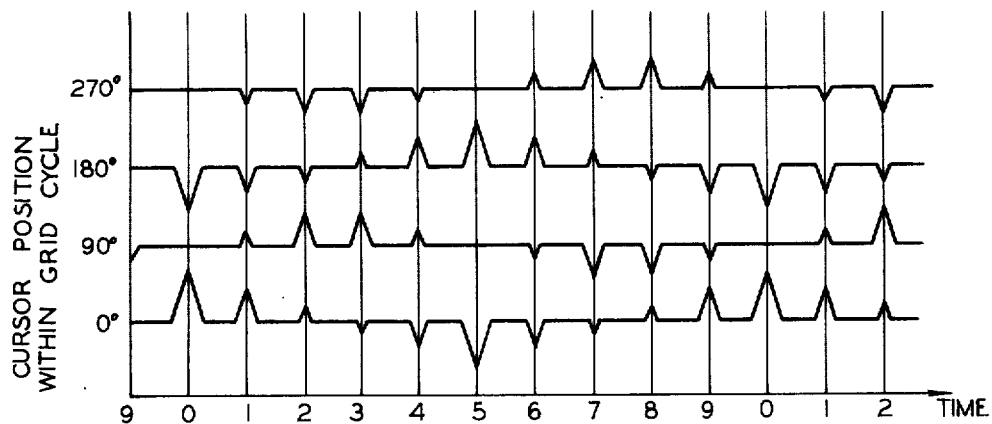
FIG. 3 shows the response of a cursor at different positions.

The cursor which senses these current pulses need not be designed to provide faithful reproduction of the current or voltage waveforms in the grid windings. The cursor preferably comprises a small circular coil although it may also be a magnetic pick-up head, Hall-effect device, or the like. The term "cursor" is used in a generic sense to mean a movable pointing device whatever the size and shape. The cursor may be of disk form with a reticle for pointing or it may be of stylus form with a pointed tip for pointing. Good performance is obtained with a coil that differentiates the current signals, i.e. the voltage generated in the cursor coil corresponds with the time rate of change of flux. Preferably the cursor coil is provided with a nonmagnetic core such as an air core or the like, i.e., it has no iron or other magnetic material to affect its fields. The time response of such a cursor coil as a function of position within one grid cycle (i.e., one pair of poles) is shown in FIG. 3. In general, it can be seen that the cursor coil responds strongly to the conductors that are nearest to it, and the response falls off rapidly to conductors more distant from the coil. More specifically, the maximum voltage is induced in a cursor coil by a given conductor in the grid windings when the cursor coil center is offset from the conductor a predetermined distance, which depends upon several factors including spacing between adjacent segments of the given conductor and coil diameter. FIG. 1 shows a portion of the 5-phase grid winding. A full cycle, i.e. a pair of poles, of the winding is shown as occupying the space between the lines marked as one pole pair. A cursor coil 8 is positioned for maximum response to current in phase winding A. This position may be regarded as the reference or zero degree position. The coil 8 is also shown in an alternate position (dashed-line), corresponding to the 270° position, at which the coil responds about equally to current in phase windings C and D. From examination of FIG. 3 it can be seen that as the coil is moved along the grid surface, a sinusoidal pulse envelope moves in time. This envelope can be processed by simple analog circuits to provide a signal that indicates the cursor position within a grid cycle.

An illustrative embodiment of the pulsed polyphase grid system will now be described with reference to FIGS. 1 through 5. One grid cycle of the winding represents one unit of distance, such as one inch, and measurement with a resolution of 0.001 inch may be obtained within each grid cycle. Multiple grid cycles are used to obtain measurements over larger distances. Measurement within a grid cycle is referred to herein as small scale or fine measurement and the measurement of the number of grid cycles is referred to as the large scale or coarse measurement.

Figure 5:
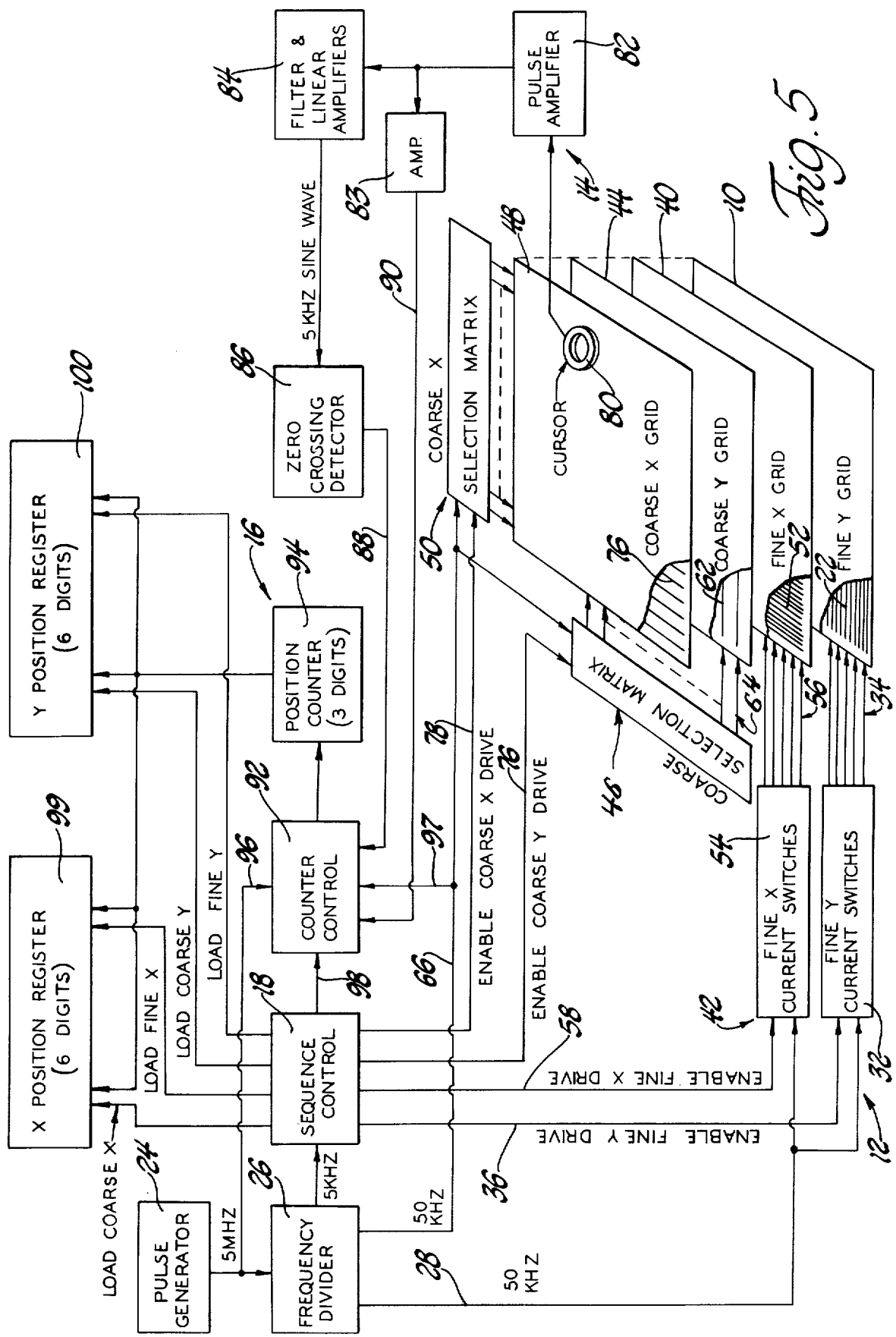
FIG. 5 is a diagram of the complete measurement system.

As shown in FIG. 5, the system comprises, in general, a fine Y-axis grid 10 and a fine Y-axis drive circuit 12 for providing excitation of the fine Y-axis grid. It also comprises a fine X-axis grid 40 and a fine X-axis drive circuit 42. The system also comprises a signal circuit 14 for developing a cursor position signal, a signal processing circuit 16 for producing X-axis and Y-axis position signals, and a sequence control 18 for controlling the operation of the drive means and signal processing circuit.

The fine Y-axis grid 10 is provided with multiple parallel spaced conductors 22 which are disposed in a polyphase group and spaced along the Y-axis, as shown in FIG. 1. In FIG. 1 the vertical portion of each conductor is the active portion in the grid and the horizontal portion constitutes the end-turn of the phase winding. It is noted that only the active portions of the conductors are shown in FIG. 5. A complete grid cycle (i.e., a pair of poles of the winding) of the polyphase grid comprises a number of active grid conductors equal to $2p$ where $p$ equals the number of phases. In the example of FIG. 1 there are 10 active conductor portions per grid cycle. Although FIG. 1 shows only one complete grid cycle it will be understood that a grid may include a large number of grid cycles (i.e. pole pairs) depending upon the range of distances to be measured. As mentioned above, a fine grid cycle represents one unit of distance such as one inch.

The phase windings A, B, C, D and E are shown in FIG. 1 as a single conductor per phase for each half grid-cycle which is typical of the prior art two-phase grid windings. In a preferred embodiment, and according to another aspect of this invention which will be described below, each phase winding comprises plural conductors for each half grid-cycle.

In the illustrative embodiment of the invention, a clock or pulse generator 24 produces a constant frequency pulse train which serves as the basic timing reference for the system. The pulse generator 24 suitably has a frequency of 5 mHz and the output thereof is applied to a frequency divider 26.

The fine Y-axis grid 10, as described above, is excited by the drive circuit 12 which comprises a set of current switches 32 operated by an output of the frequency divider 26 at a frequency of 50 kHz. For this purpose, a conductor 28 is connected from the frequency divider to one input of the current switches 32. The current switches have a set of output conductors 34, equal in number to the number of phases of the fine Y-axis grid 10 winding. The output conductors 34 are connected respectively with the phase windings of the grid. The set of current switches 32 comprises a switch for each output conductor and the switches are operated sequentially at the frequency of the incoming pulses on conductor 28 to connect the current source to the respective output conductors. The excitation pulses applied to the conductors are discrete unidirectional current pulses having fast rise and fall times with the pulse duration equal to the pulse spacing, i.e. a 50% duty cycle. The fast rise and fall times are especially useful in that the rate of change of flux and hence, induced signal voltage, varies inversely with rise and fall time. A flat top pulse causes the induced signal voltage to go to zero between the leading and trailing edges of each pulse. Accordingly, the excitation is provided by square wave pulses, i.e. pulses of substantially rectangular waveform with rise and fall times no greater than 10% of the pulse duration. In the exemplary embodiment the excitation pulses have a period of 200 microseconds, a pulse duration of 100 microseconds and the rise and fall times are about 1 microsecond. For time sharing purposes, the current switches 32 are enabled on an intermittent basis rather than a continuous basis. For this purpose, a low frequency output of 5 kHz, for example, from the frequency divider 26 is applied to the input of the sequence control 18. The sequence control supplies an enable pulse through a conductor 36 to the enable input of the current switches 32. The enable pulse on conductor 36 is suitably of a duration of 2 milliseconds which corresponds to the 10 cycles of the sequence control input frequency of 5 kHz. Thus, during the enable pulse on the conductor 36 the current switches 32 are turned on sequentially at the rate of the 50 kHz pulse train on conductor 28 and each is held on for 100 microseconds so that the grid-phase conductors are pulsed sequentially at 20 microsecond intervals with each pulse having a duration of 100 microseconds. In other words, the complete cycle of pulsing of the grid-phase conductors has a period of 200 microseconds and during each enable pulse on conductor 36, 10 pulsing cycles will be applied to the fine Y-axis grid winding.

The fine X-axis grid 40 is the same as the fine Y-axis grid 10 except that the parallel spaced conductors 52 are spaced along the X-coordinate axis. The fine X-axis drive circuit 42 comprises a set of current switches 54 which are the same as the current switches 32. The current switches 54 are operated by the frequency divider 26 through the conductor 28. The current switches 54 have output conductors 56 connected with the respective phase windings of the grid 40. An enable pulse is supplied from the sequence control 18 to the enable inputs of current switches 54 through a conductor 58.

A coarse measurement system is required to measure the position of the cursor in terms of whole number of units of distance from the origin. The coarse system may be one which is known in the prior art, such as a fine cycle counting system. However, a preferred coarse measurement system will be described below.

COARSE MEASUREMENT SYSTEM

The preferred coarse measurement system of this invention comprises a separate grid with sequentially pulsed conductors and with means for determining the address of the conductor nearest the cursor. As shown in FIG. 5, a coarse Y-axis grid 44 and a drive circuit including a selection matrix 46 are provided for determining the coarse Y-axis position. A coarse X-axis grid 48 and a drive circuit including a selection matrix 50 are also provided.

Figure 4:
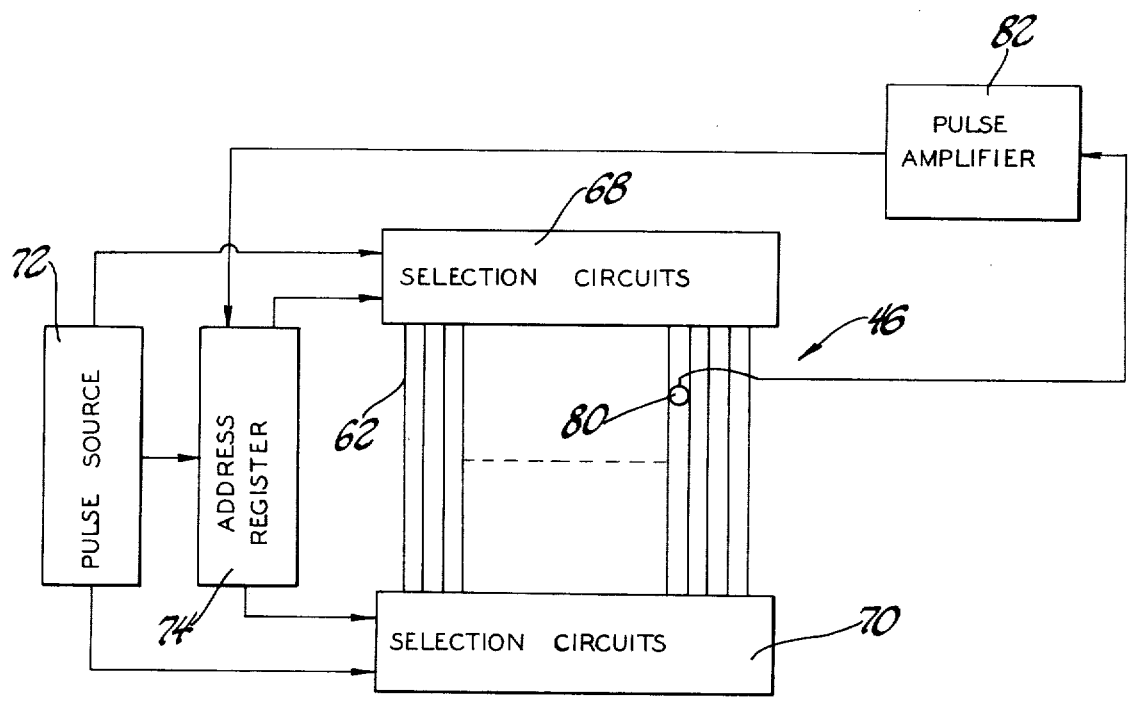
FIG. 4 is a block diagram of the coarse measurement system.

The coarse Y-axis grid 44 comprises multiple parallel conductors 62 spaced along the Y-axis as shown in FIGS. 4 and 5. The number of parallel conductors is $2n$, where $n$ is the number of grid cycles in the fine Y-axis grid. Thus, where one grid cycle of the fine Y-axis grid represents a distance of one inch, there are two conductors per inch in the coarse Y-axis array and each conductor represents an interval of one-half inch. In the coarse Y-axis grid the parallel conductors 62 are not interconnected with each other; instead each conductor is adapted to be energized independently of the other.

The coarse Y-axis grid 44, as described above, is excited by a drive circuit which comprises a selection matrix 46. The selection matrix 46 is adapted to apply current pulses in a sequential manner to each of the conductors 62. As indicated in FIG. 5 the selection matrix 46 has output conductors 64 connected respectively with the coarse Y-axis grid conductors 62. The current pulses are controlled by an output of the frequency divider 26 at a frequency of 50 kHz, for example. For this purpose a conductor 66 is connected from the frequency divider to one input of the selection matrix.

A preferred embodiment of the coarse Y-axis selection matrix 46 is shown in FIG. 4. Although a number of different well known selection and switching schemes could be employed, the circuits employed for magnetic core memories are particularly applicable. The coarse measurement technique requires that each of the conductors be energized by a current pulse, separately, at least once, but not necessarily in the order of arrangement. The address of the conductor that causes a response from the cursor denotes the coarse position of the cursor. As shown in FIG. 4, the selection matrix 46 includes selection circuits 68 of the type comprising a current source and a set of current switches with one switch for each Y-axis conductor. The matrix 46 also includes selection circuits 70 which comprise a current sink and a set of current switches with one switch for each conductor. As shown in FIG. 4, the selection circuits 68 and 70 of the matrix 46 are operated at the frequency of a pulse source 72 (which corresponds to the frequency divider 26 in FIG. 5), suitably at a frequency of 50 kHz. In order to keep track of which coarse conductor is being pulsed, an address register 74 is connected with the pulse source 72 and is incremented by each pulse. The address register 74 is connected with the selection circuit 68 and with the selection circuit 70 as indicated, to correlate the sequencing of the selection circuits with the address register.

For time sharing purposes, the coarse Y-axis grid 44 is excited intermittently rather than continuously in a manner similar to that described above for the fine Y-axis grid. For this purpose, the sequence control supplies an enable pulse through a conductor 76 to the enable input of the coarse Y-axis selection matrix 46. The enable pulse on the conductor 76 is of the same duration, namely 2 milliseconds, as the enable pulse on conductor 36 for the fine Y-axis grid. During the enable pulse on conductor 76 the coarse Y-axis grid conductors 62 are pulsed at the rate of the 50 kHz pulse train so that the conductors are pulsed sequentially at 20 microsecond intervals. In this example, using a pulse rate of 50 kHz and an enable pulse of 2 milliseconds each complete cycle of coarse position measurement would include 100 pulses. With the coarse Y-axis conductors spaced at one-half inch the grid could have a maximum dimension of 50 inches along the Y-axis.

The coarse X-axis grid 48 is the same as grid 44 except that the parallel conductors 76 are spaced along the X-axis. The coarse X-axis selection matrix 50 is the same as selection matrix 46 except that it receives an enable pulse from the sequence control 18 through conductor 78.

SIGNAL DEVELOPING AND PROCESSING CIRCUIT

As stated above, the measurement system also includes a signal circuit 14 for developing a cursor position signal. The signal circuit 14 receives an input signal from a cursor 80 which is movable by the operator over the surface of the table or grid. The cursor 80 comprises a circular coil of one or more conductor turns. The signal circuit 14 comprises a pulse amplifier 82 and the terminals of the cursor coil are connected to the input thereof. The output of the pulse amplifier 82 is applied to the input of a fine measurement signal channel which includes an envelope detector comprising a filter and linear amplifier 84. The cursor will sense the 50 kHz excitation pulses and the cursor pulses will define a signal envelope having a frequency of 5 kHz, as will be discussed below. The filter and linear amplifier 84 comprises a low pass filter which removes all frequencies higher than the envelope frequency. The output of the filter and amplifier 84 is applied to the input of a zero crossing detector 86. The zero crossing detector provides an output timing signal which is used as a stop signal on conductor 88 at each zero crossing in a given direction (positive to negative, for example) of the input envelope signal. The output of the pulse amplifier 82 is also applied to a coarse measurement signal channel which includes a polarity sensitive pulse amplifier 83. The amplifier 83 has an adjustable threshold level and the output is applied through a conductor 90 to the counter control circuit 92. The output of the pulse amplifier 83 provides an output timing signal which is used as a stop signal during the coarse measurement cycle.

As will become apparent, the fine position of the cursor (its location within a grid cycle) is represented by the time of occurrence of the stop signal from the zero crossing detector on conductor 88 relative to the start of a fine excitation cycle. The coarse position of the cursor (the number of grid cycles from the origin of the coordinate system to the cursor location) is represented by the count of excitation pulses applied during the coarse measurement cycle until a stop pulse is produced by amplifier 83 which is connected by conductor 90 to an input of a counter control circuit 92.

The signal processing circuit 16 for producing the X-axis and Y-axis position signals comprises the counter control circuit 92 and a position counter 94. The counter control circuit 92 receives the clock or timing pulses of 5 mHz from the pulse generator 24 on a conductor 96 and the timing pulses of 50 kHz from the frequency divider 26 on a conductor 97. The counter control circuit clears the position counter 94 at the start of each measurement cycle, i.e. upon receipt of a pulse from the sequence control 18 on conductor 98. This gates the timing pulses into the position counter 94 until a stop signal is applied from the signal circuit 14. In particular, the stop signal for a fine measurement cycle is the output of the zero crossing detector on conductor 88; the stop signal for a coarse measurement cycle is the output of the pulse amplifier 83 on conductor 90. The position counter 94, in the example being discussed, is suitably a 3 decade decimal counter. The position counter accumulates a count during each fine measurement cycle and during each coarse measurement cycle which represent the fine and coarse components of the cursor position being measured.

The measurement system is provided with an X-axis position register 99 and a Y-axis position register 100. The measurement component (coarse or fine component) in the position counter 94 is transferred to the appropriate register 99 or 100 under the control of the sequence control 18. The position registers 99 and 100 are adapted to hold six digits for representing the cursor position which is the sum of the coarse and fine position components.

AMBIGUITY RESOLVER

Figure 6:
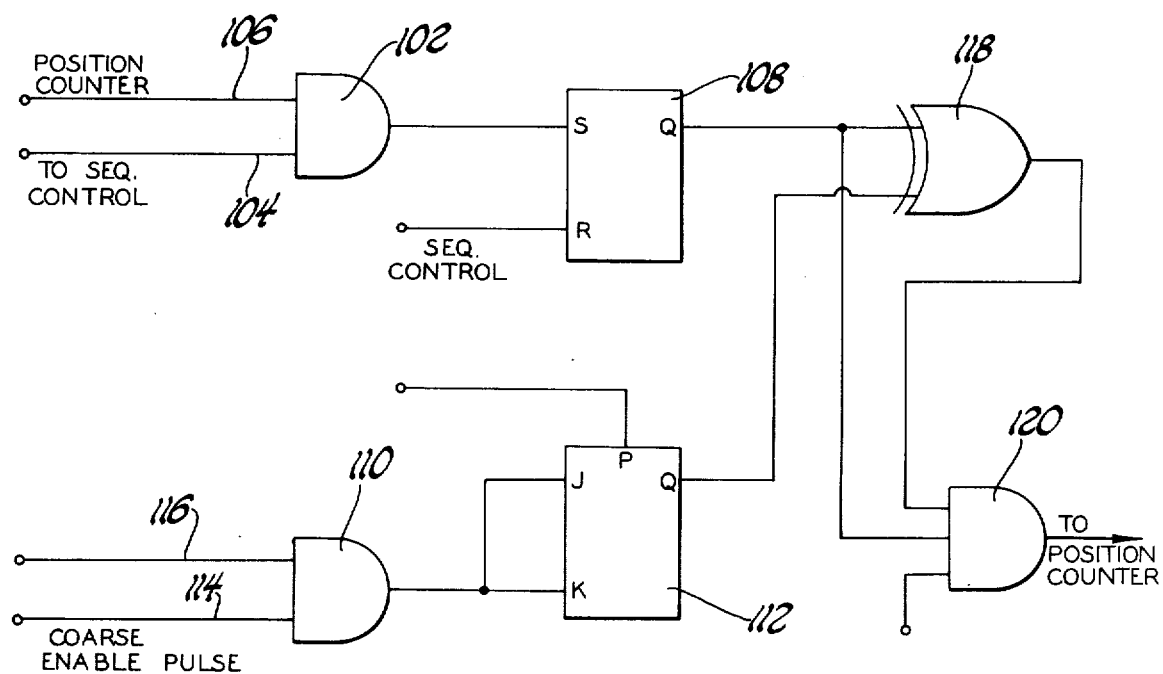
FIG. 6 shows an ambiguity resolving logic circuit.

Since the measurement system utilizes coarse and fine measurements, it is necessary to employ some form of ambiguity resolving technique to correlate the coarse and fine measurements. The provision of two coarse conductors for each fine grid cycle provides sufficient redundant information to resolve ambiguities. In a preferred embodiment, the rule for resolution is as follows: If the measured one-half inch interval for the coarse measurement differs from the measured one-half inch interval for the fine measurement, and if the fine measurement is in the upper one-half inch interval, add a single one-half inch count to the position counter. For this purpose, a logic circuit as shown in FIG. 6 is provided. The logic circuit comprises a first channel for determining whether the fine position measurement is greater or less than one-half and a second channel for determining whether the coarse position measurement is greater or less than one-half, together with comparison means for producing a correction signal if the measurements disagree. The first channel comprises an AND gate 102 having a first input 104 connected with the counter control 92 and which goes to a logical high state at the end of each fine measurement cycle. The AND gate has another input 106 connected with the position counter 94 and which goes to logical high when the count is equal to or greater than 0.500. The output of the AND gate 102 is applied to the set input of an RS flip-flop 108. The reset input of the flip-flop is connected with the sequence control which causes it to go high at the beginning of each fine measurement cycle. The Q output of the flip-flop 108 will go high and remain high after each fine measurement cycle only if the fine position measurement is equal to or greater than 0.500. The second channel comprises an AND gate 110 and a JK flip-flop 112. The AND gate 110 has an input 114 connected with the coarse enable outputs 76 and 78 of the sequence control 18. This input goes high during each coarse measurement cycle. The AND gate 110 has another input 116 connected with the conductor 66 which goes to logical high during each coarse drive pulse. The output of the AND gate 110 is applied to the J and K inputs of the flip-flop 112. The preset input of the flip-flop is connected with the sequence control 18 which supplies a logical high signal at the start of each coarse measurement period. This initially sets the Q output of the flip-flop to a logical high. The Q output of the flip-flop 112 will go to logical low when the first coarse drive pulse occurs and will go to logical high when the second drive pulse occurs. Thus the output of the flip-flop 112 is at logical high when the coarse position measurement is less than one-half inch (plus any integral number of inches) and it is at logical low for a coarse position measurement greater than one-half inch (plus any integral number of inches). The comparison means of the logic circuit comprises an exclusive OR gate 118 and an AND gate 120. The The outputs of the flip-flops 108 and 112 are applied to respective inputs of the exclusive OR gate 118. The output of the OR gate 118 will go to logical high only if the inputs differ; accordingly, the output is high when the coarse position measurement is greater than one-half inch and the fine position measurement is greater than one-half inch and the fine position measurement is less than one-half inch or vice versa. The output of the exclusive OR gate is applied to a first input of the AND gate 120. A second input of the AND gate 120 is connected with the sequence control 18 which causes it to go high near the end of each coarse measurement cycle. A third input of the AND gate is connected with the output of the flip-flop 108. Accordingly, if the output of the exclusive OR gate 114 is high and if the output of the flip-flop 104 is high, the output of the AND gate 120 will go high at coarse correction time. The output of the gate 120 is connected to the position counter 94 and applies one pulse thereto to increment the counter by one when the output of the AND gate 120 is high, i.e. when the coarse and fine position measurements disagree and the fine measurement is in the upper one-half inch interval. Unless this condition obtains the output of the AND gate 120 is zero and no correction pulse is produced.

DISTRIBUTED CURRENT PHASE WINDINGS

In the pulsed polyphase grid system described above, the phase angle of the envelope signal induced in the cursor varies as a function of cursor position within a grid cycle. The signal developing and processing circuit determines the position of the cursor by measurement of the phase angle of the envelope signal. In order for the phase angle of the position signal to be a linear function of cursor position, the induced envelope signal amplitude in the cursor must vary sinusoidally as a function of cursor position. If the cursor coil is smaller than one-half of a grid winding cycle, the amplitude of the induced signal will vary with position in the same manner as flux distribution. Thus, with approximately sinusoidal flux distribution, linear phase shift and hence accurate position determination can be achieved with a small cursor coil, i.e. a coil diameter less than one pole length or one-half of a grid winding cycle. According to this invention, the phase windings are arranged to provide distributed currents which produce approximately sinusoidal flux distribution.

Figure 7:
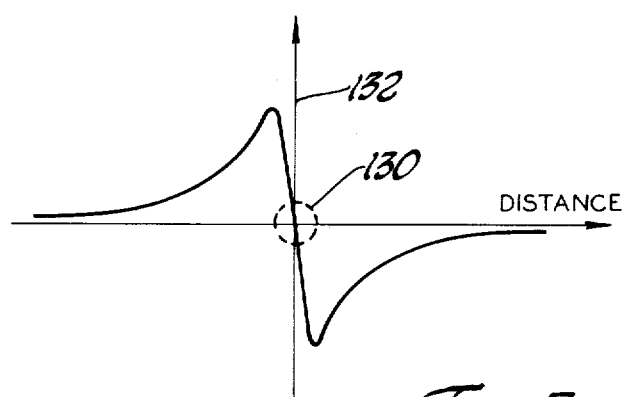
FIG. 7 shows a response curve of a small coil to a single conductor.
Figure 8:
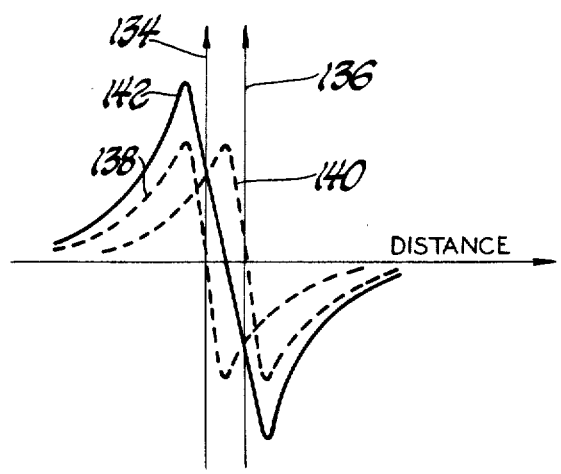
FIGS. 8, 9 and 10 show the response curve of a small coil to distributed current conductors.
Figure 9:
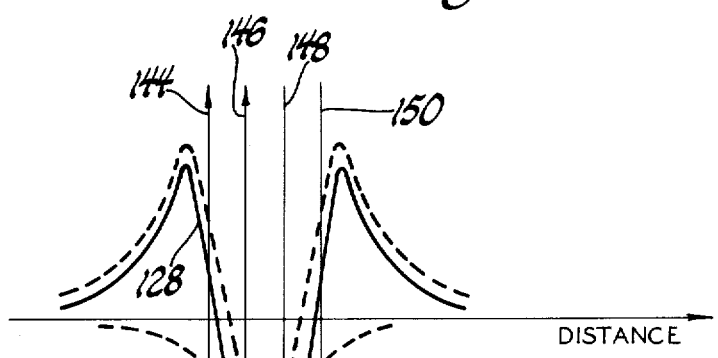
Figure 10:
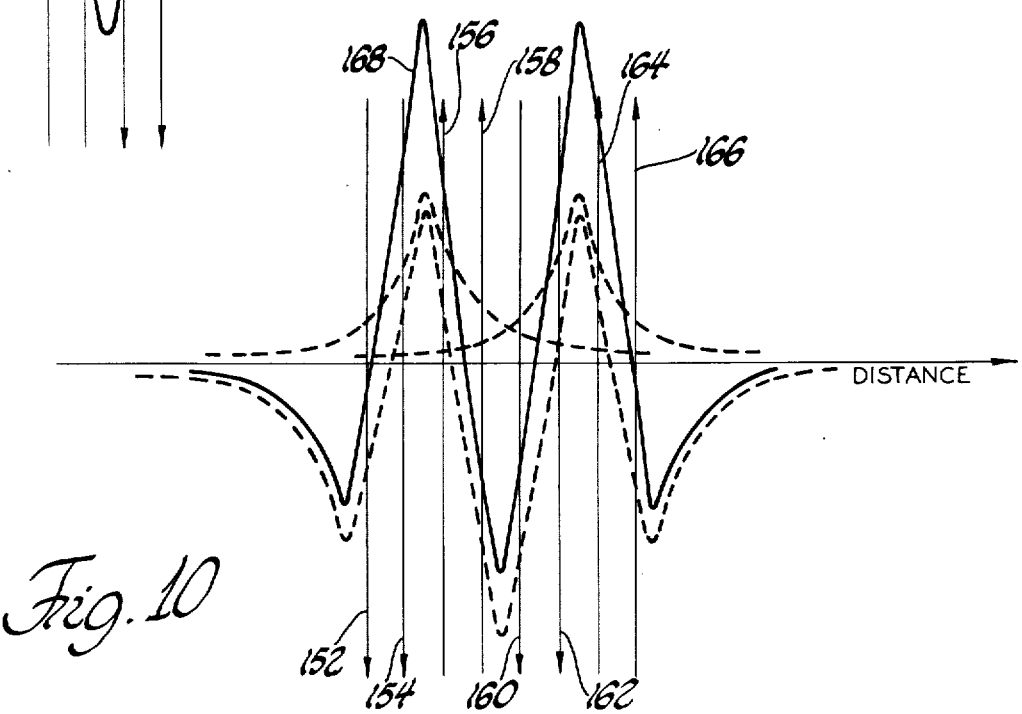

The distributed phase winding of this invention will be described with reference to FIGS. 7 through 10 and with reference to FIGS. 11 through 16. For explanatory purposes the response of a small coil 130 to a single conductor 132 carrying an alternating current is shown in FIG. 7. In this figure, the voltage induced in the coil is plotted as a function of coil position relative to the conductor. The conductor 132 is positioned on the ordinate axis and when the small coil 130 is positioned directly over the conductor the induced voltage is zero. A maximum response voltage is obtained when the coil edge is positioned above the conductor and the response diminishes with increasing displacement. The induced voltage is of one phase on one side of the conductor and of the opposite phase on the other side of the conductor. It can be shown that the composite response curve for a winding comprising parallel conductors with alternate conductors carrying current in opposite directions is a double-peaked waveform and hence does not approximate a sinusoid. On the other hand, as shown in FIG. 8, the composite response curve of a small cursor coil to two adjacent conductors carrying current in the same direction does approximate a sinusoid with a single-peak waveform. In the example represented by FIG. 8, the two conductors 134 and 136 are spaced by a distance of one diameter of the cursor coil. The response curve for the conductor 134 is shown as waveform 138 and the response curve for the conductor 136 is shown as waveform 140. The composite response curve is waveform 142. FIG. 9 shows the individual and composite waveforms of a cursor coil to two pairs of conductors with each conductor of a pair carrying current in the same direction. In FIG. 9 conductors 144 and 146 carry current in one direction and conductors 148 and 150 carry current in the other direction. The composite waveform 152 approximates a sinusoid. In FIG. 10 the response curve for four pairs of conductors is shown. Conductors 152 and 154 carry current in one direction, conductors 156 and 158 carry current in the opposite direction, while conductors 160 and 162 carry current in the one direction and conductors 164 and 166 carry current in the opposite direction. It is noted that the composite waveform 168 approximates a sinusoid. It is also noted that the distributed current windings produce a greater flux intensity and hence a larger induced voltage.

A distributed current winding is used, according to this invention, for each phase winding of the grid. (Thus, in the embodiment described with reference to FIG. 1, each phase conductor A, B, C, D and E is replaced with a distributed current winding.) Each distributed current phase winding will occupy a full grid cycle or pole pair with the individual conductors being positioned within the grid cycle according to a desired number and spacing.

Figure 11:
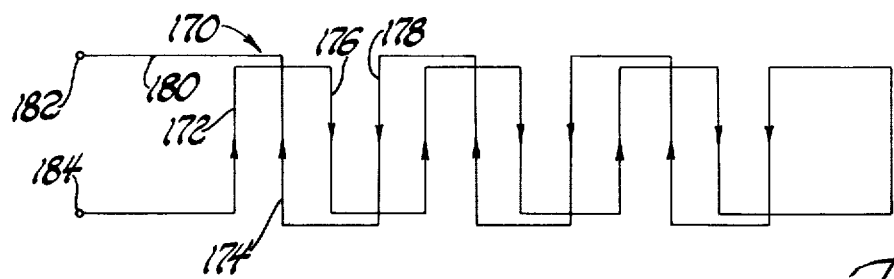
FIG. 11 shows a distributed current winding with four conductors per cycle.
Figure 12:
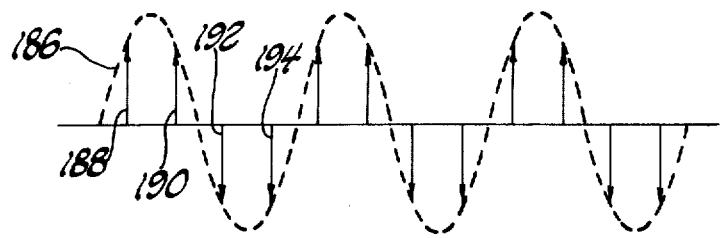
FIG. 12 shows the flux distribution for the winding of FIG. 11.

FIGS. 11 through 16 illustrate distributed current phase windings based upon the principles explained above. FIG. 11 shows a distributed current phase winding 170 which comprises four conductor segments 172, 174, 176 and 178 within each grid cycle. The conductor segments are equally spaced and all segments carry the same current. The conductor segments are arranged in pairs, such as conductor segments 172 and 174, with the segments of each pair carrying current in the same direction. The other grid cycles of the phase winding are the same as that just described. The entire phase winding is suitably formed of a single conductor 180 extending between terminals 182 and 184. The phase winding 170 produces a space distribution of flux which is approximately sinusoidal, as represented by the waveform 186 in FIG. 12. In this illustration, the arrows 188 and 190 represent currents of equal amplitude and in the same direction through conductors 172 and 174 respectively; similarly the arrows 192 and 194 represent currents of equal amplitude and in the same direction through conductors 176 and 178 respectively. The arrows occupy an angular position relative to the sine wave which is the same as the angular position of the respective conductors relative to the grid cycle. The amplitude of the current is proportional to the amplitude of the sine wave at the given angular position.

Figure 13:
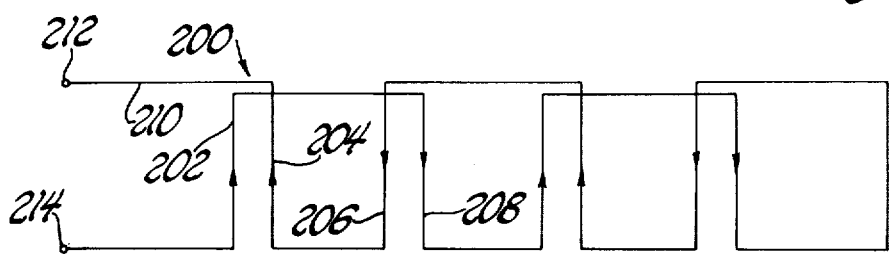
FIG. 13 shows a distributed current winding with four unequally spaced conductors per cycle.
Figure 14:
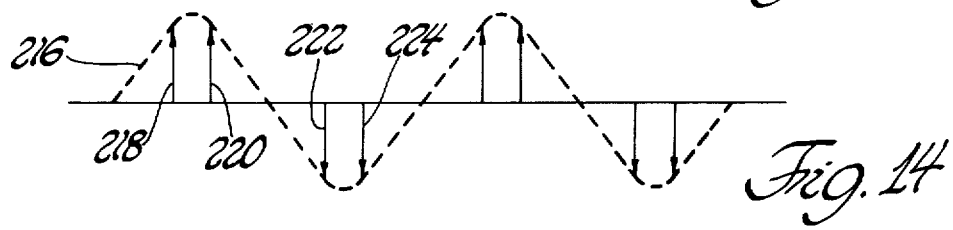
FIG. 14 shows the flux distribution for the winding of FIG. 13.

FIG. 13 shows a distributed current phase winding 200 which comprises four conductor segments 202, 204, 206 and 208 within each grid cycle. The conductor segments are unequally spaced but all segments carry the same current. The conductor segments are arranged in pairs, such as segments 202 and 204, with the segments of each pair carrying current in the same direction. The other grid cycles of the phase winding are the same as that just described. The phase winding 200 is suitably formed of a single conductor 210 extending between terminals 212 and 214. The phase winding 200 produces a space distribution of flux which is approximately sinusoidal and represented by the waveform 216 in FIG. 14. In this illustration the arrows 218 and 220 represent currents of equal amplitude in the same direction through conductors 202 and 204 respectively; similarly the arrows 222 and 224 represent currents through the conductors 206 and 208 respectively. As indicated, the amplitude of the current is proportional to the amplitude of the sine wave at the given angular position of the respective conductors.

Figure 15:
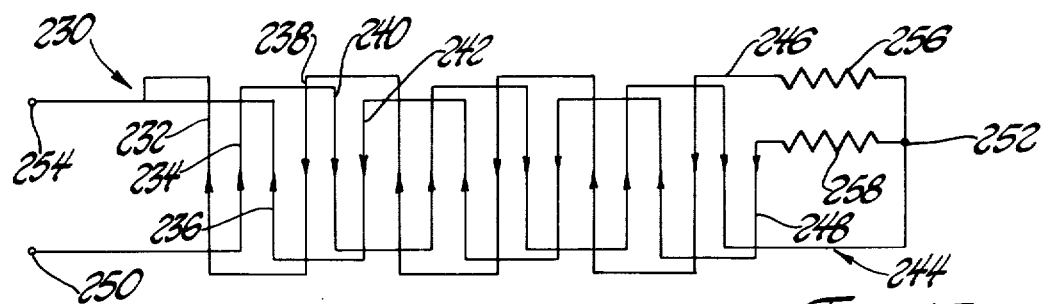
FIG. 15 shows a distributed current winding with six conductors per cycle.
Figure 16:
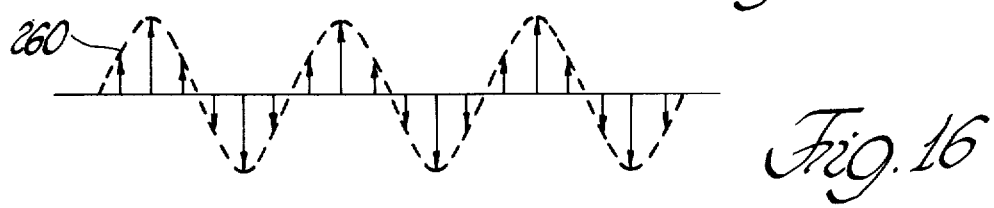
FIG. 16 shows the flux distribution for the winding of FIG. 15.

FIG. 15 shows a distributed current phase winding 230 which comprises six conductor segments 232, 234, 236, 238, 240 and 242 within each grid cycle. The conductor segments are equally spaced but the segments carry unequal currents. The conductor segments are arranged in groups of three, such as segments 232, 234 and 236, with the segments of each group carrying current in the same direction. The other grid cycles of the phase winding are the same as that just described. The set of conductor segments of each group, namely, segments 234 and 240 for all grid cycles are suitably formed of a single conductor 244; similarly, the left-hand segments of each group, namely segments 232 and 238, for all cycles are also suitably formed from a single conductor 246. Likewise the right-hand conductor segments of each group, namely segments 236 and 242, for all cycles are formed from a single conductor 248. The conductor 244 is connected at one end with a terminal 250 and at the other end it is connected to a junction point 252. The conductors 246 and 248 are connected in parallel between the junction point 252 and another supply terminal 254 through respective current limiting resistors 256 and 258. In this arrangement, the conductor 244 carries a current which is twice the amplitude of the current in conductors 246 and 248. The phase winding 230 produces a space distribution of flux which is approximately sinusoidal, as represented by the waveform 260 in FIG. 16. In this illustration, the arrows represent current amplitudes at the angular position of the respective conductors in the grid cycle.

OPERATION

The operation of the position measurement system will now be described with reference to the diagrams of FIGS. 17 through 21. The position of the cursor 80 on the table or grid surface is defined by a set of X and Y coordinates having an origin at a selected position with reference to the table. In the exemplary embodiment of the invention described above, the X and Y coordinates are measured in units of inches, suitably up to 50 inches, and decimal parts of an inch, suitably with a resolution of 0.001 of an inch.

Figure 17:
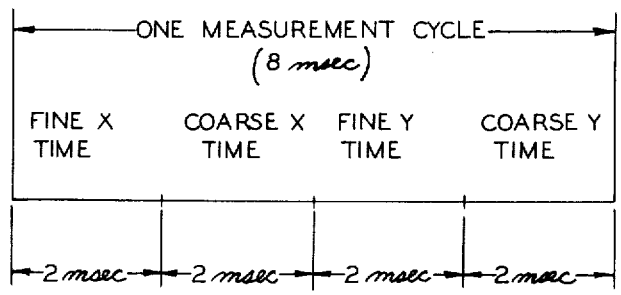
FIGS. 17, 18 and 19 are timing diagrams for a fine measurement cycle.

One complete position measurement cycle includes a fine X-axis measurement cycle followed by a coarse X-axis measurement cycle and a fine Y-axis measurement cycle followed by a coarse Y-axis measurement cycle. This sequence for the complete measurement cycle is depicted in FIG. 17 and has a time period of 8 milliseconds with 2 milliseconds being allotted to each coarse and fine measurement cycle. This sequencing, which allows time sharing of the circuits, is controlled by the sequence control 18 which generates enable pulses of 2 millisecond duration on the conductors 58, 78, 36 and 76 in that order in continuing repetition.

Figure 18:
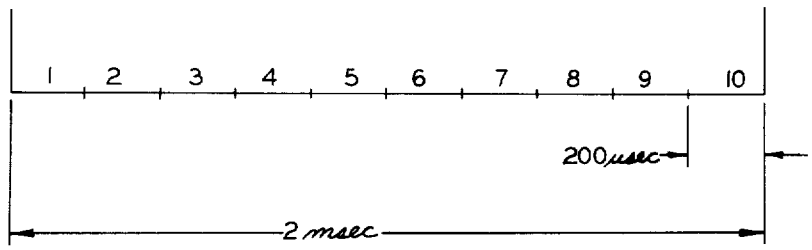
Figure 19:
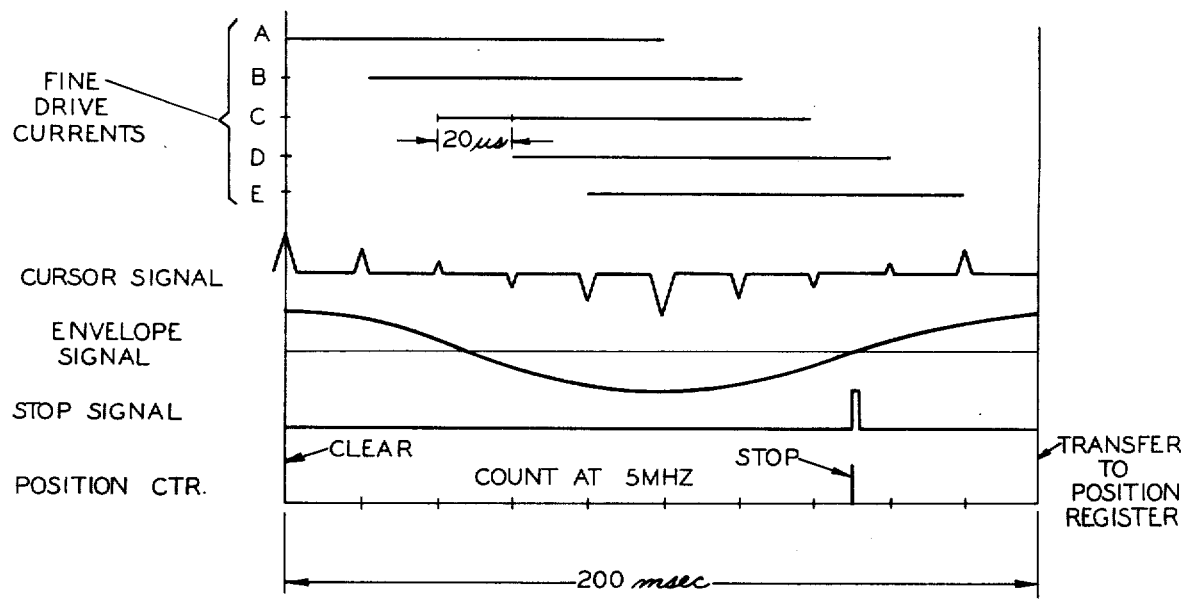

The operation of the system for the fine X-axis measurement and fine Y-axis measurement is the same except that the measurements are made at different time periods, as indicated in FIG. 17 by reason of the respective grids being excited under control of the respective enable pulses. The timing for a fine measurement cycle, suitably for the X-axis, is depicted in FIGS. 18 and 19. During the fine X-axis cycle the enable signal is applied by the sequence control through a conductor 58 to the fine X-axis current switches 54. Also, the excitation pulse train, at 50 kHz, is applied by the frequency divider 26 through the conductor 28 to the current switches 54. This causes the current switches 54 to pulse the phase windings sequentially as depicted in FIG. 2. An excitation cycle of the phase windings has a period of 200 microseconds and, during the enable pulse on conductor 58, the current switches will sequence through 10 complete excitation cycles at the 5 kHz repetition rate. The 10 excitation cycles, numbered 1 through 10, are shown in FIG. 18. It is preferred to take the measurement during the tenth excitation cycle only so that the pulse amplifier 82 and the filter and linear amplifier 84 will have a chance to stabilize during the first nine excitation cycles. At the beginning of the tenth excitation cycle, the counter control 92, under the control of the sequence control 18, causes the position counter 94 to start at 000 and count the five mHz clock pulses until a fine stop pulse is received. This will occur at some count between 000 and 999 as a function of the position of cursor 80, as will be described below.

The excitation cycle during which measurement is taken, namely the tenth cycle, is shown in detail in the timing diagram of FIG. 19. The time period of the phase winding drive currents for phases A, B, C, D and E are shown opposite the corresponding letters at the upper part of FIG. 19. (Note that this portion corresponds with FIG. 2). The phase winding drive currents will be sensed by the cursor coil and a cursor signal comprising discrete pulses will be applied to the pulse amplifier 82, as indicated in FIG. 19. Note that the example cursor signal of FIG. 19 corresponds to a cursor position at 0° within one of the grid cycles, which is also shown in FIG. 3. The cursor signal is applied to a filter and linear amplifier 84 which produces a position signal corresponding to the envelope of the cursor signal pulses and which is a sinusoidal waveform of 5 kHz frequency. The envelope signal is applied to the input of the zero crossing detector 86 which produces a stop pulse when the envelope signal goes from negative to positive. The stop pulse is applied to the counter control 92 and stops the position counter 94 at the count existing at the occurrence of the stop pulse. At the end of the tenth excitation cycle the count held in the position counter 94 is mapped into the least significant three digits of the X position register 99. The action of the position counter is depicted in the diagram of FIG. 19. At the end of the tenth excitation cycle, a data bit in the logical high state is stored in the counter control 92 if the fine measurement is equal to or greater than 0.500. This data bit is used for the ambiguity resolution discussed above.

Figure 20:
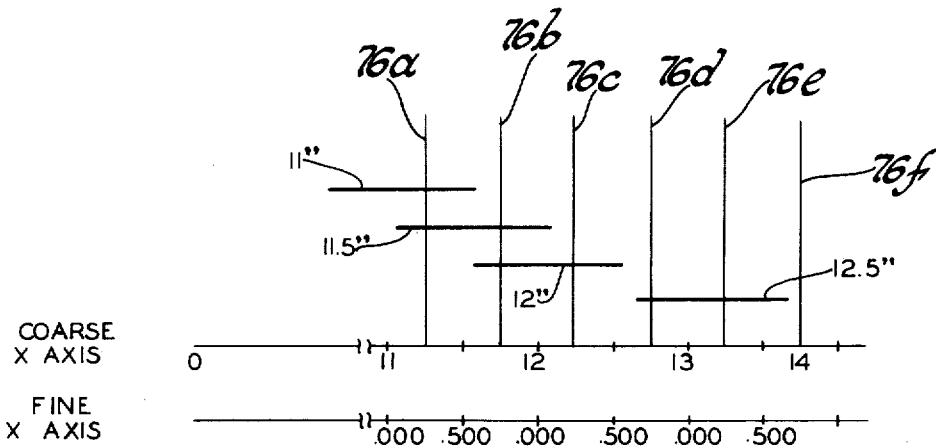
FIG. 20 is a diagram showing coarse measurement response regions.

At the end of the fine X-axis measurement cycle, the enable pulse on conductor 78 initiates the coarse X-axis measurement cycle. The operation of the coarse measurement cycle will be described with reference to the diagram of FIG. 20 and the timing diagram of FIG. 21. The description will be given with reference to the coarse X-axis measurement cycle and it will be understood that the same description applies to the coarse Y-axis measurement cycle, except for the difference in time of occurrence. In FIG. 20, the coarse X-axis coordinates are shown on one horizontal line in units of one inch and the fine X-axis coordinates are shown on another horizontal line with an indicated resolution of 0.001 inch. It is noted that the X-axis coordinates start with zero at the origin and a discontinuity is indicated for convenience of illustration with only the range of 11 to 14 inches being shown in FIG. 20. The coarse X-axis conductors 76 in this range are represented by vertical lines 76a through 76f. It is noted that the fine X-axis grid conductors are not shown in FIG. 20 but that one complete grid cycle is provided for each unit of measurement (one inch) along the X-axis. It is further noted that the coarse X-axis conductors (being two per unit of measurement), are located approximately at the one-quarter inch and three-quarter inch positions within each unit of measurement. As shown in FIG. 20 conductor 76a is located at 11.250 inches, conductor 76b is located at 11.750 inches and conductor 76c is located at 12.250 inches and the other coarse conductors are located accordingly. When the conductor 76b receives a coarse drive pulse it produces a magnetic field which will induce a voltage in the cursor greater than a predetermined threshold value with the cursor positioned laterally from the conductor within a given range of distance. The pulse amplifier 83 is provided with a threshold adjustment and it is also polarity sensitive so that only voltages of one polarity, namely, positive voltages, are passed by the amplifier. Consequently, the cursor 80 and pulse amplifier 83 will produce a coarse position signal only when the cursor is positioned laterally on one side only of a given conductor and within a response range of distance. In FIG. 20 the horizontal line 11" represents the response range for conductor 76b, the horizontal line 11.5" represents the response range for conductor 76c, the horizontal line 12" represents the response range for conductor 76d and the horizontal line 12.5" represents the response range for conductor 76f. Each response range must be at least one-half inch wide, i.e. one-half the unit of distance, and the right-hand edge of each response range should be located immediately to the left of the conductor to which it relates.

Figure 21:
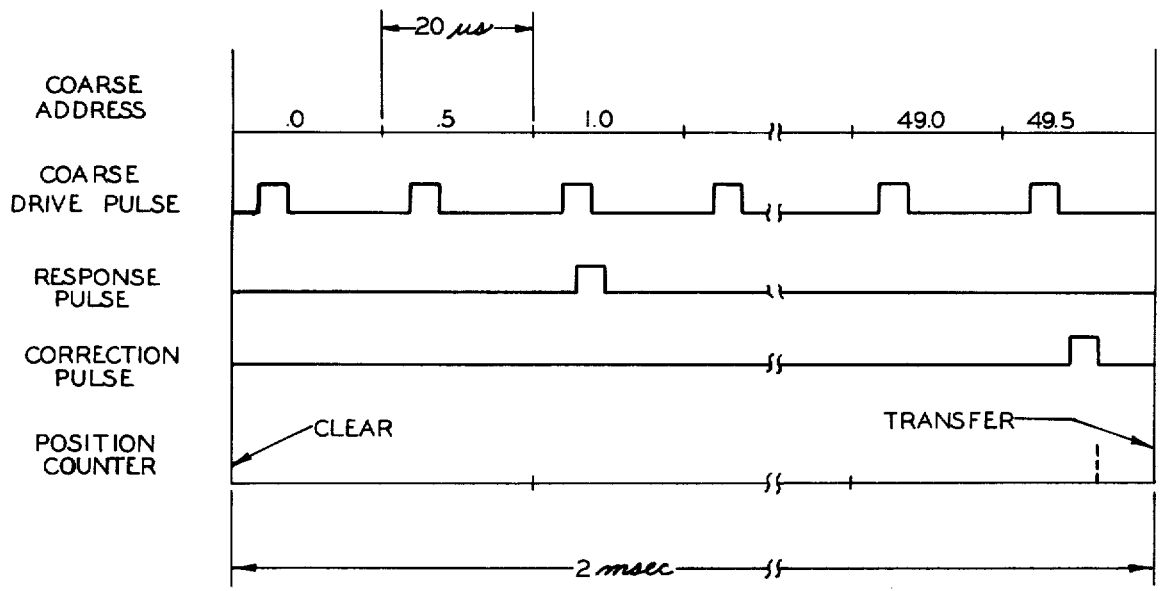
FIG. 21 is a timing diagram for a coarse measurement cycle.

The timing diagram for the coarse X-axis measurement cycle is shown in FIG. 21. A measurement period of two milliseconds is provided by the enable pulse on the conductor 78 from the sequence control 18. The measurement period is divided into one hundred intervals of 20 microseconds each by reason of the 50 kHz excitation pulse train supplied by the frequency divider 26 on conductor 66. This pulse train is supplied to the address register 74, as shown in FIG. 4, which is incremented by each pulse and thus holds a count corresponding to the coarse conductor being pulsed. The coarse address is indicated in FIG. 21 by the blocks labeled 0.0, 0.5, 1.0, etc. The coarse drive pulses, one for each coarse address, are also shown in FIG. 21. The response pulse from the pulse amplifier 83, for the example represented by FIG. 21, occurs when the address of 1.0 is reached. The position counter 94 as indicated in FIG. 21, is cleared at the beginning of the coarse measurement cycle. During the measurement cycle, the position counter is incremented by one every second-time that the coarse conductor address is incremented until a response pulse is received from the coarse amplifier which stops the counter. At the end of the coarse measurement period the contents of the counter are copied into the most significant digit positions of the coarse X position register 99. After a coarse amplifier response pulse is received, the counter remains static until just before the end of the measurement period. At this time, the counter control 92 causes operation of the ambiguity resolver which was described above. The correction pulse, if required, occurs at the time indicated in FIG. 21 and adds 1 inch to the position counter.

This completes the X-axis measurement and the X-axis position of the cursor, as determined by the fine measurement cycle and the coarse measurement cycle is stored in the X-axis position register 99. At the end of the coarse X-axis cycle, the fine Y-axis measurement cycle is started and it is immediately followed by the coarse Y-axis measurement cycle. Thus, the Y-axis position of the cursor is determined and stored in the Y-axis position register 100.

Although the description of this invention has been given with respect to a particular embodiment it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. Apparatus for measuring the position of a cursor along a coordinate axis on a reference surface comprising: a polyphase grid winding disposed in a plane parallel to said surface with each phase winding having multiple parallel conductors spaced in the direction of said coordinate axis and forming multiple pairs of poles in said grid winding, polyphase excitation means connected with said grid winding for sequentially applying square wave current pulses to the successive phase windings, said cursor including a sensing coil inductively coupled with the polyphase grid winding for producing a position signal having a phase angle corresponding to the position of the cursor within a pole pair of said grid winding, and means connected with the cursor and responsive to said position signal for determining the position of said cursor.

2. The invention as defined in claim 1 wherein said pulses have a duration equal to the spacing between pulses.

3. The invention as defined in claim 1 wherein said last mentioned means comprises a clock pulse generator, a counter connected with said generator, and means for clearing said counter at the beginning of an excitation cycle, and means for stopping said counter when said position signal reaches a predetermined value.

4. The invention as defined in claim 3 wherein the means for stopping the counter includes an envelope detector connected with said cursor, and a zero crossing detector connected between said envelope detector and said counter.

5. The invention as defined in claim 1 wherein said polyphase excitation means comprises a set of current switches connected respectively with the phase windings of said polyphase grid winding.

6. The invention as defined in claim 1 including a coarse measuring means including counting means for counting the number of pole pairs of said grid winding between the origin of said coordinate axis and the poler pair within which the cursor is located.

7. The invention as defined in claim 6 wherein said counting means comprises a coarse measurement grid with plural parallel conductors disposed in a plane parallel to said surface and spaced in the direction of said coordinate axis with at least one conductor disposed within each pole pair of said polyphase grid winding, a coarse grid excitation means for sequentially applying said excitation pulses to said conductors of the coarse measurement grid, a position counter connected with said source of pulses, means for clearing said position counter at the beginning of the excitation cycle of the coarse measurement grid, stop pulse producing means connected with said cursor and responsive to a coarse excitation pulse for stopping said counter.

8. The invention as defined in claim 7 including control means connected with said polyphase excitation means and with said coarse grid excitation means for alternately enabling excitation of the polyphase grid winding and the coarse measurement grid whereby said cursor alternately produces a position signal in response to the excitation of the polyphase grid winding and a response pulse in response to the excitation of the coarse measurement grid.

9. The invention as defined in claim 1 wherein each phase winding includes plural conductors per pole with the conductors being distributed so that a current in the conductors produces an approximately sinusoidal distribution of magnetic flux.

10. The invention as defined in claim 9 wherein the sensing coil of said cursor is circular and has a diameter less than one-half of a pole length.

11. Apparatus for measuring the position of a cursor relative to a set of coordinate axes on a reference surface comprising an X-axis polyphase grid winding with each phase winding disposed in a plane parallel to said surface and having conductors spaced in the direction of the X-axis, a Y-axis polyphase grid winding with each phase winding disposed in a plane parallel to said surface and having conductors spaced in the direction of said Y-axis, X-axis switching means connected with said X-axis grid winding, Y-axis switching means connected with said Y-axis grid winding, a clock pulse generator, control means connected with said generator and having a first output and a second output connected respectively with said X-axis switching means and said Y-axis switching means, and producing X-axis and Y-axis enable pulses alternately on said first and second outputs, said cursor including a sensing coil inductively coupled with the X-axis and the Y-axis polyphase grid windings, said enable pulses alternately enabling said X-axis switching means and said Y-axis switching means whereby said X-axis and Y-axis grid windings are alternately excited and whereby said cursor alternately produces an X-axis position signal and a Y-axis position signal, and phase angle measuring means connected with the cursor for measuring the respective phase angles of the position signals.

12. The invention as defined in claim 11 wherein said phase angle measuring means comprises a clock pulse generator, a counter connected with said generator, means for clearing said counter at the beginning of an excitation cycle, and means for stopping said counter when said position signal reaches a predetermined value.

13. Apparatus for measuring the position of a cursor along a coordinate axis on a reference surface comprising, a measurement grid including multiple parallel conductors spaced in the direction of the coordinate axis, grid excitation means connected with said conductors for sequentially applying current pulses thereto, a counter connected with said excitation means for counting the pulses, means for clearing the counter before the application of a pulse to the first conductor, said cursor including a sensing means coupled with the conductors for producing a cursor signal, stop pulse means connected with the sensing means for producing a stop pulse in response to a cursor signal caused by the excitation pulse applied to the conductor nearest the position of the cursor, said stop pulse means being connected with said counter to stop the counter at a count indicative of the position of the cursor.

14. The invention as defined in claim 13 wherein said sensing means comprises a coil inductively coupled with said conductors.

15. The invention as defined in claim 14 wherein said stop pulse means comprises a polarity sensitive amplifier having an adjustable threshold level.

16. The invention as defined in claim 14 including a polyphase grid winding disposed in a plane parallel to said surface with each phase winding having multiple parallel conductors spaced in the direction of said coordinate axis and forming multiple pairs of poles in said polyphase grid winding, at least one of the conductors of said measurement grid disposed within each pair of poles, polyphase excitation means connected with said polyphase grid winding, said cursor being inductively coupled with said polyphase grid winding for producing a position signal having a phase angle corresponding to the position of the cursor within a pair of poles of said grid winding, and means connected with the cursor for measuring the phase angle of said position signal.

17. The invention as defined in claim 16 including control means connected with said polyphase excitation means and with said grid excitation means for alternately enabling excitation of the polyphase grid winding and the coarse measurement grid whereby said cursor alternately produces a position signal in response to the excitation of the polyphase grid winding and a stop pulse in response to the excitation of the coarse measurement grid.

18. The invention as defined in claim 16 wherein two conductors of said measurement grid are disposed within each pair of poles.

19. The invention as defined in claim 18 including ambiguity resolving means connected with said position counter and said coarse excitation means.

20. An apparatus for measuring the position of a cursor along a coordinate axis on a reference surface, said apparatus being of the type comprising a polyphase grid winding disposed in a plane parallel to said surface with each phase winding having multiple parallel conductors spaced in the direction of said axis and forming multiple pairs of poles in said grid winding, said cursor including a winding in coupled relation to said grid winding, excitation means connected with one of said windings, and phase angle measuring means connected with the others of said windings, the improvement comprising plural conductors per pole in each phase winding, the conductors of each pole being spaced apart within the pole length to produce an approximately sinusoidal distribution of magnetic flux.

21. The invention as defined in claim 20 including means to supply equal current to all of the conductors in each pole.

22. The invention as defined in claim 21 wherein all of the multiple conductors are equally spaced.

23. The invention as defined in claim 21 wherein said means to supply current is operative to supply current in the same direction through all the conductors in a given pole.

24. The invention as defined in claim 20 including means to supply unequal currents to the plural conductors in each pole.

25. The invention as defined in claim 20 including means for supplying current to the conductors in each pole with the value of current in a given conductor being proportional to the value at the position of the conductor of a sine wave distribution of flux over the pole length.

* * * * *